US008511601B2

(12) United States Patent
Dandaroy et al.

(10) Patent No.: US 8,511,601 B2
(45) Date of Patent: Aug. 20, 2013

(54) AIRCRAFT WITH TUNED VIBRATION ABSORBER MOUNTED ON SKIN

(75) Inventors: Indranil Dandaroy, Littleton, CO (US); Mohammed Taj Bhuiyan, Wichita, KS (US)

(73) Assignee: Hawker Beechcraft Corp., Wichita, KS (US)

( * ) Notice: Subject to any disclaimer, the term of this patent is extended or adjusted under 35 U.S.C. 154(b) by 181 days.

(21) Appl. No.: 12/587,108

(22) Filed: Oct. 1, 2009

(65) Prior Publication Data

US 2011/0079680 A1 Apr. 7, 2011

(51) Int. Cl.
*B64C 1/40* (2006.01)

(52) U.S. Cl.
USPC ............. 244/1 N; 244/119; 267/136; 188/379

(58) Field of Classification Search
USPC ......... 244/1 N, 119, 129.1; 267/136, 140.11; 188/379, 378, 380
See application file for complete search history.

(56) References Cited

U.S. PATENT DOCUMENTS

| 2,270,335 | A | | 1/1942 | Parkison et al. | |
|---|---|---|---|---|---|
| 3,487,888 | A | * | 1/1970 | Bennett, Jr. et al. | 181/207 |
| 4,534,526 | A | * | 8/1985 | Metzger et al. | 244/38 |
| 4,715,559 | A | | 12/1987 | Fuller | |
| 5,687,948 | A | * | 11/1997 | Whiteford et al. | 248/635 |
| 5,712,447 | A | | 1/1998 | Hanson | |
| 5,845,236 | A | | 12/1998 | Jolly et al. | |
| 5,906,254 | A | | 5/1999 | Schmidt et al. | |
| 5,984,233 | A | | 11/1999 | Snyder, Jr. et al. | |
| 6,006,875 | A | * | 12/1999 | van Namen | 188/378 |
| 6,298,842 | B1 | | 10/2001 | Sims | |
| 6,916,017 | B2 | * | 7/2005 | Noe | 267/161 |
| 2005/0133325 | A1 | | 6/2005 | Kuwayama et al. | |
| 2007/0068756 | A1 | * | 3/2007 | Huston et al. | 188/378 |

OTHER PUBLICATIONS

Office Action from U.S. Appl. No. 12/587,109 mailed Jan. 3, 2012.
U.S. Appl. No. 12/587,109.
Bombardierò, The Noice and Vibration Suppression (NVS) System, Jan. 2007, 2 pages.
Fuller et al., Journal of Sound and Vibration, 203(5); 745-761 (1997).
Jolly et al., Journal of Sound and Vibration, 191(4); 577-583 (1996).
Vaicaitis et al., "Noise Transmission Through Aircraft Panels", American Institute of Aeronautics and Astronautics, pp. 211-221 (1984).
Wright et al., Journal of Vibration and Control, 10; 1221-1237 (2004).
Hackstein et al., "The Dornier 328 Acoustic Test Cell (ATC) for Interior Noise Tests and Selected Test Results", DGLR/AIAA 14th Aeroacoustics Conference, May 11-14, (1992).
Sun et al., Applied Acoustics, 48(4); 311-321 (1996).
Garcea, Abstracts of Papers Presented at the 4th CASI Aerodynamics Symposium, May 3-4, 1993, 5 pages.
Metzger, "Strategies for Aircraft Interior Noise Reduction in Existing and Future Propeller Aircraft", Business Aircraft Meeting and Exposition, Wichita, Kansas, Apr. 7-10, 1981, 16 pages.
Waterman et al., "Fokker's Activities in Cabin Noise Control for Propeller Aircraft", Business Aircraft Meeting and Exposition, Wichita, Kansas Apr. 12-15, 1983, 7 pages.
Wright, "A Hierarchial Noise Control System Using Adaptable Tuned Vibration Absorbers", Dissertation submitted to the Faculty of the Virginia Polytechnic Institute and State University in partial fulfillment of the requirements for the degree of Doctor of Philosophy in Mechanical Engineering, 2003, 261 pages.
Office Action from U.S. Appl. No. 12/587,109 mailed Jun. 5, 2012.

* cited by examiner

*Primary Examiner* — Christopher P Ellis
(74) *Attorney, Agent, or Firm* — Kenneth H. Jack; Davis & Jack, L.L.C.

(57) ABSTRACT

An apparatus and method for attenuating noise and vibration in a propeller aircraft comprises a tuned vibration absorber adapted to be mounted to the skin of a fuselage of a propeller aircraft. The tuned vibration absorber may be tuned to the second harmonic of a blade passage frequency of a propeller of the aircraft. The tuned vibration absorber may be connectable to a separately formed mount, which can be mounted to the fuselage skin independently of the tuned vibration absorber. The apparatus may include a cover to prevent interference between the tuned vibration absorber and other components in the aircraft. The apparatus may be used in combination with other attenuation systems to attenuate noise and vibration over a broad range of frequencies.

32 Claims, 4 Drawing Sheets

AIRCRAFT WITH TUNED VIBRATION ABSORBER MOUNTED ON SKIN

BACKGROUND OF THE INVENTION

In comparison to turbojet transportation, propeller driven aircraft, such as piston-engine and turboprop aircraft, have historically been considered less comfortable from a noise and vibration standpoint. In a propeller driven aircraft, the propellers tend to contribute noise and vibration at a frequency referred to as the "blade passage frequency" and at harmonics of that frequency. As referred to herein, the blade passage frequency or "BPF" is the product of the propeller shaft rotational speed times the number of blades on a propeller. For example, an aircraft having a 3-blade propeller on a shaft turning at 2000 revolutions per minute has a BPF of 3×2000 or 6000/minute, i.e., 100 Hz. Most commonly, all of the propellers on a multi-propeller aircraft have the same number of blades and operate at the same rotational speed, so that there is only a single BPF for the entire aircraft. Typical aircraft have at least one preferred cruise setting, at which the propellers will operate at a particular rotational speed. Thus, there will typically be a single BPF for the entire aircraft corresponding to that preferred cruise setting.

FIG. 3 is a graph showing representative interior noise levels in one type of propeller aircraft at high speed cruise. As shown in the graph, the sound pressure level spikes at the BPF and successive harmonics thereof. This aircraft has a BPF of approximately 100 Hz. The interior sound pressure level spikes at a frequency equal to the BPF, also referred to herein as the "first harmonic of the BPF." The sound pressure level also spikes at the second harmonic of the BPF, or approximately 200 Hz, and at the third harmonic of the BPF, or approximately 300 Hz, and so on. As the graph shows, the highest two spikes in sound pressure level are at the first and second harmonics of the BPF.

Over the past several decades, considerable effort has been expended developing systems to attenuate some of the undesirable noise and vibration in propeller driven aircraft. Major considerations in the development of noise and vibration control systems include keeping added weight and cost to a minimum, while maximizing attenuation of unwanted noise and vibration.

Such noise and vibration control systems are generally classified as either active or passive. Active systems comprise using secondary control sources to add additional energy to a vibrating system to cancel out the primary excitation. For example, active noise control comprises using acoustic sources, such as loudspeakers, to cancel targeted sound within the aircraft coming from the propellers. Active structural acoustic control, on the other hand, comprises using vibration inputs, such as shakers or piezoelectric materials, to modify the sound field in the aircraft. Another technique includes "synchrophasing," which includes adjusting the relative rotational phase of the propellers in a multiple-propeller aircraft to reduce interior noise.

Passive systems, on the other hand, do not require a power source to provide energy to the system. Passive techniques include providing damping material, such as thermal/acoustical insulation blankets, along the interior of the aircraft fuselage to muffle sound transmission into the interior of the aircraft. Other passive systems include providing vibration absorbers to attenuate vibration of the fuselage structure. For example, one such prior art system (as shown in FIGS. 1 and 2) includes mounting tuned vibration absorbers ("TVAs") to the frames of the fuselage to attenuate vibration of the fuselage structure.

FIGS. 1 and 2 illustrate portions of the interior of the fuselage of the King Air 350 model turboprop aircraft manufactured by Hawker Beechcraft Corporation. The fuselage comprises a series of frames 10. Each frame 10 is generally in the form of a ring that extend around the fuselage in the circumferential direction. The frames 10 are spaced apart along the longitudinal extent of the aircraft and are interconnected by a series of stringers 12, which run along the longitudinal direction of the aircraft, transverse to the frames 10. The frames 10 and stringers 12 are connected to the skin 14 of the aircraft, which forms the exterior surface of the aircraft fuselage and which encloses the interior volume of the aircraft.

Vibration attenuation systems 16 are attached to the frames 10 for lessening vibration of the fuselage. Each attenuation system 16 comprises first and second TVAs 18, 20 connected to a mounting bracket 22. Each mounting bracket 22 is secured to a fuselage frame 10 such that the TVAs 18, 20 are positioned adjacent to the frame 10. The attenuation systems 16 are generally arranged in pairs at each frame 10, as shown in FIG. 2, with attenuation systems 16 being attached to both the forward and aft sides of the frames 10. The TVAs 18, 20 of each attenuation system 16 are arranged to attenuate vibration of the frame 10 in the direction normal to the aircraft fuselage. Each TVA 18, 20 is a mass and spring system. The mass is configured to move towards and away from the central longitudinal axis of the fuselage to attenuate vibration in that direction. Specifically, each of the TVAs 18, 20 includes a spring in the form of an elongated plate 24 connected to the mounting bracket 22 at approximately the center of the plate 24 and having masses 26 connected at each end of the plate 24. The plate 24 is flexible and permits the masses 26 to move towards and away from the central longitudinal axis of the fuselage in response to vibration of the frame 10 along that direction, which vibration is transmitted to the TVAs 18, 20 through the mounting bracket 22. Each of the two TVAs 18, 20 is designed to be tuned to a different frequency. In particular, the first TVA 18 is tuned to 100 Hz (i.e., the first harmonic of the BPF) and the second TVA 20 is tuned to 200 Hz (i.e., the second harmonic of the BPF).

Despite the above progress in the art, further improvement is still desirable.

BRIEF SUMMARY OF THE INVENTION

One aspect of the present invention provides a method for attenuating noise and vibration in a propeller aircraft. The method according to this aspect of the invention desirably includes mounting one or more tuned vibration absorbers to the skin of the fuselage.

Another aspect of the present invention provides an aircraft. The aircraft according to this aspect of the invention desirably includes one or more first tuned vibration absorbers mounted to the skin of the fuselage.

Each of the tuned vibration absorbers may be tuned to a harmonic of the blade passage frequency of the propellers of the aircraft, such as the second harmonic of the blade passage frequency.

Although the present invention is not limited by any theory of operation, it is believed that, even when the fuselage frames are damped, the skin continues to exhibit significant localized skin vibrations at particular harmonics of the BPF. Mounting to the skin a TVA tuned to that harmonic of the BPF is believed to attenuate such localized skin vibrations, and hence interior noise. In particular, a TVA tuned to the second harmonic of the BPF, or a higher harmonic, provides more effective attenuation when mounted to the skin than when mounted to the frame. By contrast, a TVA tuned to the first harmonic (i.e., fundamental) of the BPF provides effective attenuation when mounted to the frame, since the fuselage vibration at that low frequency is believed to be dominated by the frames. Thus, a particularly effective system uses TVAs tuned to the first harmonic mounted to the frame in combination with TVAs tuned to the second harmonic mounted to the skin.

DETAILED DESCRIPTION

In describing the preferred embodiments of the invention illustrated in the appended drawings, specific terminology will be used for the sake of clarity. However, the invention is not intended to be limited to the specific terms so selected.

Figure 4:
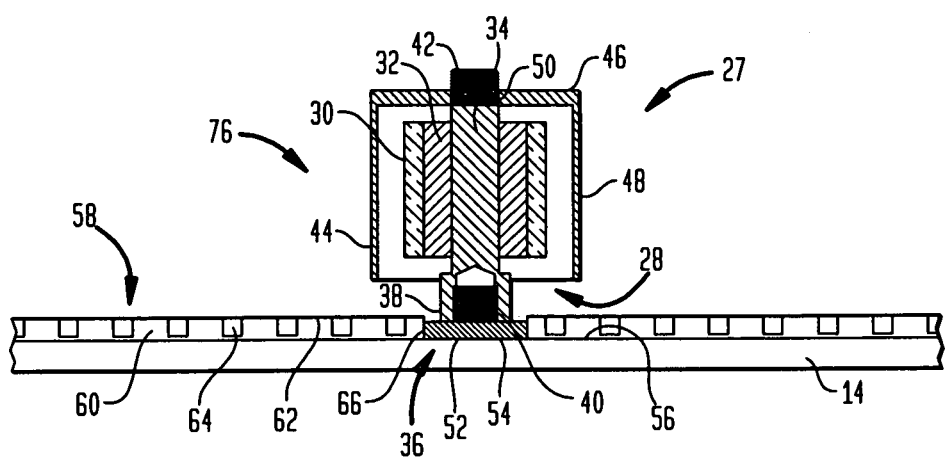
FIG. 4 is a sectional view of certain components of a system for attenuating noise and vibration in a propeller aircraft in accordance with one embodiment of the invention.
Figure 5:
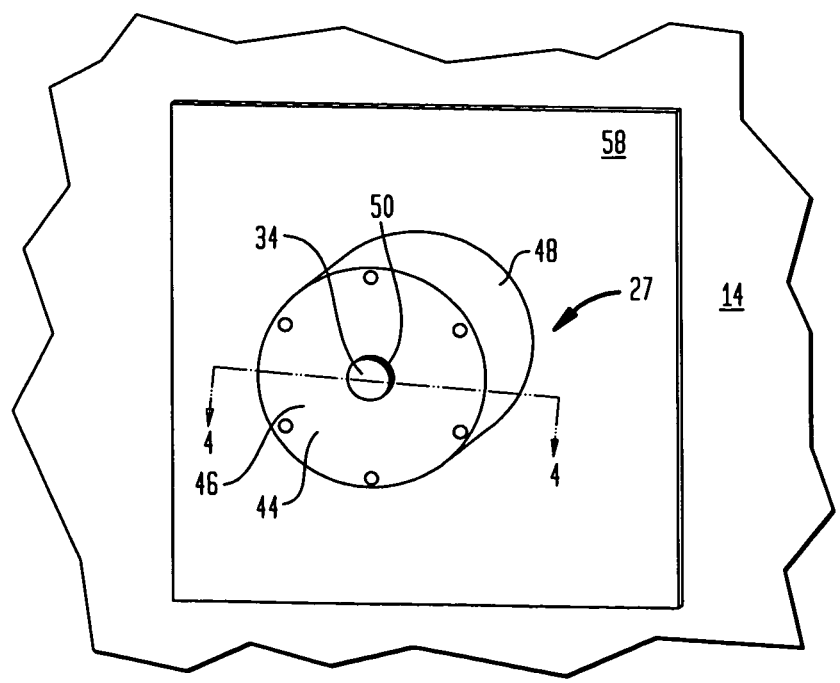
FIG. 5 is a perspective view of the components of FIG. 4.

An apparatus 27 for attenuating noise and vibration in a propeller aircraft in accordance with one embodiment of the present invention includes a TVA 28 (FIG. 4). The TVA 28 is comprised of a mass 30 and an elastomeric component 32 attached to a centerpost 34. The mass 30 is shaped as a generally annular thick-walled metal tube. The elastomeric component 32 also has a generally annular shape sized to fit between the mass 30 and the centerpost 34. The centerpost 34 is shaped as an elongated, generally cylindrical rod. At one end of the centerpost 34 is a coupling element in the form of a female threaded socket 38. At the opposite end of the centerpost 34 is another coupling element in the form of a male threaded portion 42. The elastomeric component 32 is preferably injection molded, and the mass 30, elastomeric component 32, and centerpost 34 can thus be bonded together during the molding process. Alternatively, the mass 30, elastomeric component 32, and centerpost 34 can be attached together after they are manufactured by, for example, bonding them together with an adhesive or securing them together with mechanical fasteners. The mass 30, elastomeric component 32, and centerpost 34 are interconnected such that the elastomeric component 32 acts as a spring permitting the mass 30 to move back and forth along the longitudinal axis of the centerpost 34. The elastomeric nature of the elastomeric component 32 also provides damping to the TVA 28.

The materials for the mass 30 and elastomeric component 32 are selected in conjunction with the sizing and shaping of those components such that the TVA 28 is tuned to a desired frequency. The TVA 28 is preferably tuned to one of the significant vibration frequencies exhibited by the fuselage skin 14 at a particular cruise setting. For example, a preferred tuning frequency is the second harmonic of the propeller BPF at high speed cruise. The relationship between the tuning frequency and the mass and stiffness of a tuned vibration absorber is known per se and is given by the equation:

$$f_t = \frac{1}{2\pi}\sqrt{\frac{k}{m}} \quad (1)$$

where $f_t$ is the tuning frequency in Hz, k is the stiffness of the spring, and m is the TVA mass. The parameters relating to the mass 30 are typically designed based on considerations of the modal mass of the vibrating structure that is being attenuated (e.g., a skin panel). An exemplary mass 30 may be constructed of stainless steel and may have a weight of approximately 0.1 pounds (0.045 kg), a height of approximately inch (2.5 cm), an outer diameter of approximately 1 inch (2.5 cm), and an inner diameter of approximately 0.75 inches (1.9 cm). The parameters relating to the elastomeric component 32 are then designed to produce the desired stiffness and damping based on the selected mass. It is noted that increasing the amount of damping will provide a greater bandwidth of attenuation, however such an increase will conversely decrease the amount of attenuation provided at the tuned frequency. The amount of damping can be expressed as a quality factor, or "Q factor," which characterizes the TVA's tuned frequency relative to its bandwidth. Preferred Q factors for the skin-mounted TVA 28 may be in the range of 14 to 33. Exemplary materials for the elastomeric component 32 may include silicone, flurosilicone, or any other rubber-like polymer.

The male threaded portion 42 of the centerpost 34 is configured to engage a cover 44 to secure the cover 44 to the centerpost 34. The threaded portion 44 may include thread lock to prevent loosening of the cover 44 from the centerpost 34. The cover 44 is preferably a generally hollow cylindrical component sized and shaped to encase the TVA 28 to prevent contact between the TVA 28 and external objects that could interfere with the movement of the mass 30. The cover 44 may be made up of a circular top wall 46 and a cylindrical side wall 48. The top wall 46 and side wall 48 may be integrally formed, such as by casting or machining the cover 44 to the preferred shape, or the top wall 46 and side will 48 may be separately formed components that are joined together by mechanical fasteners, adhesive bonding, welding, or any other appropriate manner. The cover 44 preferably includes a coupling element in the form of a threaded through-hole 50 shaped to securely engage the threaded portion 42 of the centerpost 34.

The centerpost 34 is configured to releasably secure the TVA 28 to a mount 36. A coupling element on the mount 36, in the form of a male threaded stud 40, is shaped to releasably connect to the female threaded socket 38. Thread lock may optionally be provided at the threaded interface to prevent loosening of the threaded engagement. The mount 36 may be formed from a generally circular plate element 52 having the stud 40 disposed at the center thereof. The plate element 52 and the stud 40 may be integrally formed, such as by casting or machining, but those components could also be separately formed and joined together by any appropriate manner. The plate element 52 has a substantially flat back side 54 which is shaped to abut the interior surface 56 of the fuselage skin 14. The plate element 52 is configured to be securely connected to the skin 14, such as by adhesively bonding the components together. Preferably the adhesive is designed to support both the weight of the TVA apparatus 27 and the loads subjected to the apparatus 27. In addition, a preferred adhesive should resist stress corrosion and have a set time of less than 2 hours.

The adhesive is preferably applied between the back side 54 of the plate element 52 and the interior surface 56 of the fuselage skin 14, in order to secure the TVA mount 36 to the skin 14.

The centerpost 34, mount 36, and cover 44 are preferably constructed of materials that provide strength and durability while minimizing weight and increased costs. Preferred materials may include aluminum, but any other suitable materials may be used.

Figure 1:
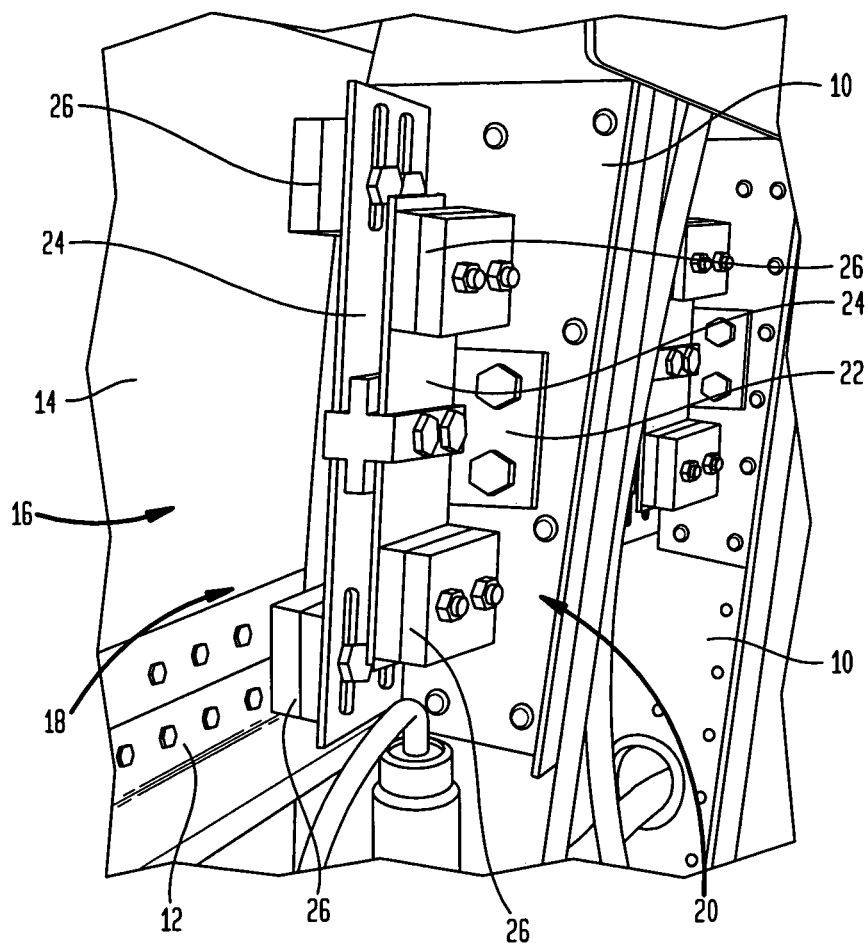
FIG. 1 is a perspective view of portions of a prior art propeller aircraft and a prior art system for attenuating noise and vibration in such aircraft.
Figure 2:
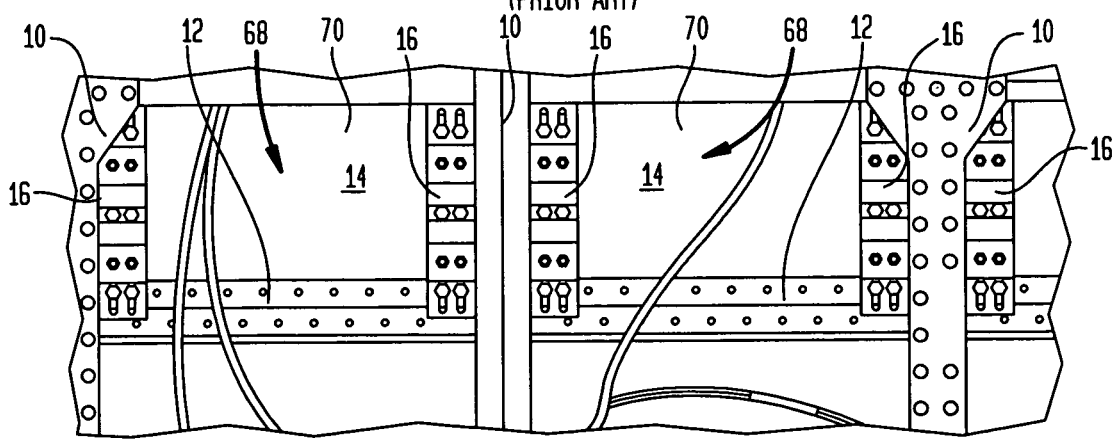
FIG. 2 is an elevational view depicting an arrangement of the components shown in FIG. 1.
Figure 3:
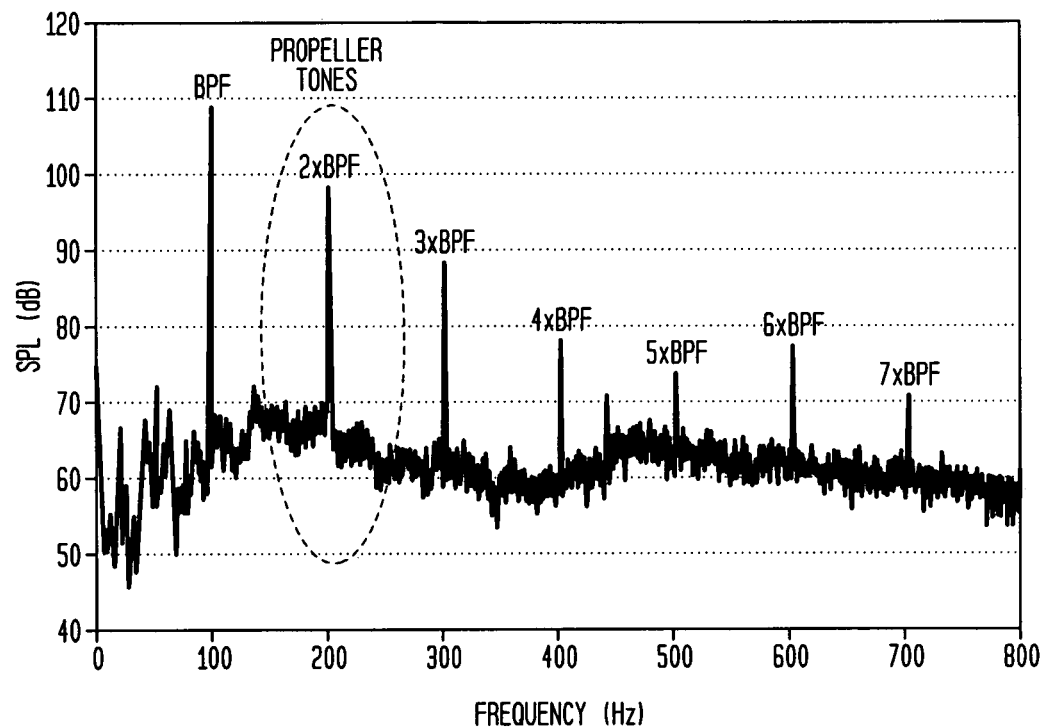
FIG. 3 is a representative graph of interior noise in an aircraft.
Figure 6:
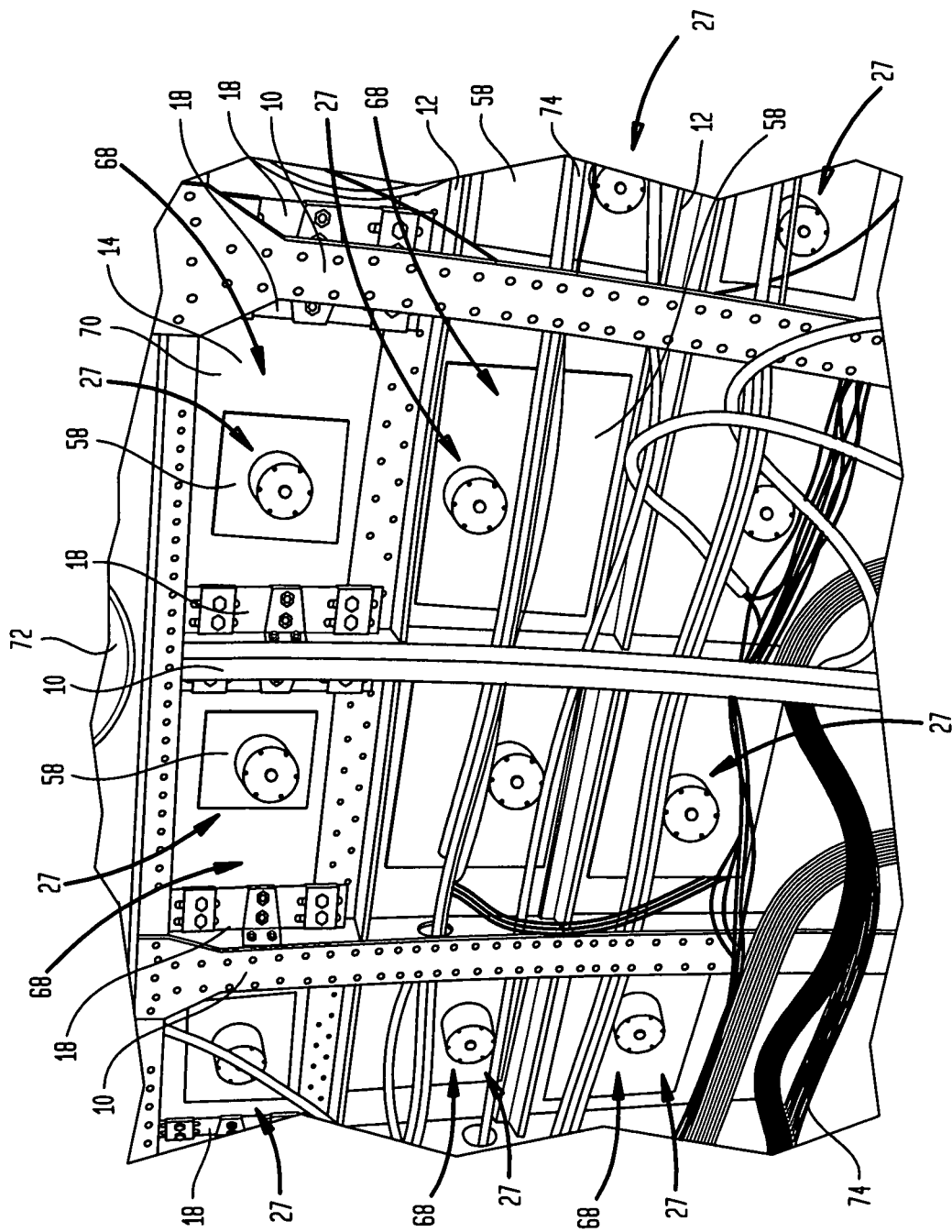
FIG. 6 is a perspective view depicting a plurality of the components of FIG. 4, together with additional components of the vibration attenuation system and aircraft.

In an aircraft fuselage, a bay 68 (see FIGS. 1 and 6) is defined as the space defined between two adjacent frames 10 and two adjacent stringers 12. A skin panel 70 (see FIGS. 1 and 6) is defined as the approximately rectangular portion of fuselage skin 14 defined between adjacent frames 10 and adjacent stringers 12 and adjoining each bay 68. A skin panel 70 will have minimum flexural rigidity at its center, and thus forced vibration from the propellers at the second harmonic of the BPF will likely result in the highest deflections of the skin panel 70 at its center point. Thus, a preferred location of the skin-mounted TVA apparatus 27, in accordance with one aspect of the present invention, may include locating one of the apparatuses 27 at approximately the center of the skin panel 70. A system of such skin-mounted TVA apparatuses 27 may be distributed throughout the aircraft in numerous bays 68, as shown in FIG. 6. It is believed that the noise and vibration attenuation of the skin-mounted TVA apparatuses 27 has a local effect, and therefore, to maximize effectiveness while minimizing weight and cost, it is preferable to locate the apparatuses 27 where they will produce the greatest noise and vibration reduction from the standpoint of the aircraft passengers. In this regard, a preferred arrangement of skin-mounted TVA apparatuses 27 may include locating one apparatus in each bay 68 in the passenger portion of the aircraft (i.e., the portion above the floor line). Furthermore, particularly important locations may include the skin panels 70 just below the passenger windows 72.

In conjunction with the system of skin-mounted TVA apparatuses 27 described above, frame mounted TVAs may also be incorporated as part of a system for attenuating noise and vibration in accordance with a preferred embodiment of the present invention. In a preferred system, as shown in FIG. 6, the skin-mounted TVA apparatuses 27 containing TVAs tuned to the second harmonic of the BPF are implemented in conjunction with frame-mounted TVAs 18 tuned to the first harmonic.

A surface damping treatment 58 is also preferably used in conjunction with the system of frame-mounted and skin-mounted TVAs. The surface damping treatment 58 may be applied directly to the fuselage skin 14 to dissipate vibrational energy. The surface damping treatment 58 may be a free-layer damping system or a constrained-layer damping system and may incorporate a stand-off layer. A free-layer system is one in which a layer of damping material, such as a viscoelastic material, is directly adhered to a vibrating surface (e.g., the fuselage skin 14). A free-layer system dissipates energy by stretching and compressing as the underlying surface flexes during vibration. A constrained-layer system includes a layer of damping material adhered to the vibrating surface, like a free layer system, and further includes a relatively stiff layer (i.e., a "constraining" layer) overlying the damping material layer. The constraining layer in a constrained-layer system induces shear strains in the damping material layer when the underlying surface flexes during vibration, thus dissipating energy. A stand-off layer is typically used in conjunction with a constrained-layer system. In particular, a stand-off layer is included between the damping material layer and the vibrating surface to magnify shear deformation in the damping material layer, due to the increased distance between the damping material layer and the neutral axis of the vibrating surface.

A preferred surface damping treatment 58 may be a stand-off constrained-layer system, such as those manufactured by Damping Technologies Incorporated of Mishawaka, Ind. A stand-off constrained-layer system is illustrated in FIG. 4, having a constrained-layer system 62 overlying a stand-off layer 60 that is attached to the fuselage skin 14. The stand-off layer has properties which are weak in bending and stiff in shear. Grooves 64 may be distributed along the layer to decrease the bending stiffness and mass of the stand-off layer 60. The surface damping treatment 58 is preferably adhered to the skin 14 by a pressure sensitive adhesive. The surface damping treatment 58 also preferably includes a die-cut hole 66 therethrough sized and shaped to receive the plate element 52 of the TVA mount 36 so that the mount 36 may be directly bonded to the fuselage skin 14 through the hole 66, as shown in FIG. 4.

An appropriately designed surface damping treatment 58, such as a stand-off constrained-layer system as illustrated in FIG. 4, is believed to provide effective attenuation of noise and vibration at the third and higher harmonics of the BPF. Additionally, the frame-mounted TVAs 18 are believed to provide effective attenuation at the first harmonic of the BPF. Thus, one preferred configuration in accordance with the present invention, as shown in FIG. 6, may include: frame-mounted TVAs 18 tuned to the first harmonic of the BPF and mounted to the frames 10, skin-mounted TVA apparatuses 27 tuned to the second harmonic of the BPF and mounted to the skin 14, and a stand-off constrained-layer surface damping treatment 58 attached to the skin 14.

As discussed above, the centerpost 34 of the skin-mounted TVA apparatus 27 may be removably coupled to the mount 36 via coupling elements, such as threaded female socket 38 and threaded male stud 40 (see FIG. 4). In one preferred installation method in accordance with the present invention, the mount 36 is secured to the fuselage skin 14 independently of the remainder of the apparatus 27. In this way, the remaining components of the skin-mounted TVA apparatus 27 do not interfere with the installation of other components near the fuselage, such as cables 74 and other equipment. The remaining components of the skin-mounted TVA apparatus 27 can then be provided as a sub-assembly 76 which is attached to the already mounted TVA mount 36, such as by connecting the socket 38 of the TVA sub-assembly 76 to the stud 40 on the mount 36. Preferably the sub-assembly 76 is attached after other equipment has been installed, but before the thermal/acoustical insulation blankets are installed. The thermal/acoustical insulation blankets are typically installed on the fuselage after the other equipment running along the fuselage has been run and before the interior trim is installed. The insulation blankets typically overlie the other equipment, such as cables, to provide a generally continuous layer of thermal and acoustic insulation. The above-described cover 44 of the skin-mounted TVA apparatus 27 preferably prevents other components, such as the cables 74 and the thermal/acoustical insulation blankets, from interfering with the movement of the components of the TVA 28.

If the skin-mounted TVA apparatus 27 is being used in conjunction with other noise and vibration attenuation systems, such as a surface damping treatment 58, the skin-mounted TVA apparatus 27 and the other attenuation systems may be installed in any order. For example, a surface damping treatment 58 having a hole 66 may be installed before the TVA apparatus 27 or its mount 36. In that case, the mount 36 may be subsequently attached to the skin 14 through the hole 66 in the surface damping treatment 58. Alternatively, the TVA mount 36 may be installed before the surface damping treatment 58, which can then be installed by fitting the hole 66 over the already installed mount 36 and adhering the treatment 58 to the skin 14. If the surface damping treatment 58 includes a pressure sensitive adhesive for adhering to the skin 14, the adhesive may be protected by a release liner. In such a case, the release liner may be peeled away before installing the surface damping treatment 58.

Among the benefits believed to be provided by the present invention is better attenuation performance over a wider range of frequencies than simply using frame-mounted TVAs alone. In particular, it is believed that the increased damping effect caused by the elastomeric material in the elastomeric component 32 provides a wider bandwidth of attenuation than the plate-spring 24 and mass 26 system of the frame-mounted TVAs 18, 20. This preferably leads to better performance over many flight conditions, including aircraft climb and travel with a variety of propeller speeds. This design also preferably leads to greater tolerances with respect to tuning frequency (e.g., 4%, compared to approximately 0.25% for the frame-mounted TVAs 18, 20). Furthermore, the skin-mounted TVA apparatus 27 may also preferably be made smaller and lighter than a corresponding frame-mounted TVA tuned to the same frequency. Thus, to reduce weight, skin-mounted TVA apparatuses 27 tuned to a particular frequency, such as the second harmonic of the BPF, may be used instead of the frame-mounted TVAs 20 tuned to that frequency. However, in an alternative embodiment of a system in accordance with the present invention, frame-mounted TVAs tuned to the second harmonic of the BPF may be used in conjunction with skin-mounted apparatuses 27 containing TVAs tuned to the same harmonic.

Many variations of the above described embodiments are possible within the scope of the present invention. For example, the present invention is not limited to the above-described shapes of the components. For instance, the TVA 28, the centerpost 34, and the cover 44 need not be cylindrical and the mount 36 need not be circular. Any other appropriate shapes for those components may be utilized. Moreover, other means for connecting the various components together can be utilized. For example, instead of the centerpost 34 having a coupling element in the form of a male threaded portion 42 for connecting to the cover 44, the coupling element could include a female threaded socket in the centerpost 34. In such a configuration, a separate threaded fastener (e.g., a bolt) configured to couple to the socket could be provided to secure the cover 44 to the centerpost 34. In an alternative, the cover 44 may include a male threaded member for directly coupling to the socket. However, threaded fastening engagement is not required. The cover 44 can be secured to the centerpost 34 by any appropriate fastener. The cover 44 could also be glued or welded to the centerpost 34. In another example, the corresponding male and female coupling elements of the centerpost 34 and the mount 36 may be interchanged, and a male member on the centerpost may engage a female member on the mount. Again, threaded fastening engagement is not required, and the centerpost 34 and mount 36 may be connected by any appropriate mechanism that preferably allows the TVA sub-assembly 76 to be easily mounted to the mount 36 after the mount 36 has already been secured to the fuselage skin 14. The TVA sub-assembly 76 is preferably removable from the mount 36 after it has been mounted thereto, however that is not necessary.

In other variations, the TVA apparatus 27 may be attached to the fuselage skin 14 by other than adhesive bonding. For example, the mount 36 may be mechanically fastened to the skin 14. However, the use of adhesives is preferred because of issues which can arise from mechanical fastening of the apparatus 27 to the skin 14, including increased weight and additional difficulty manufacturing and installing the relevant components, as well as stress concentrations.

In still further variations, the TVA apparatus 27 may be attached to the skin 14 via other components. For example, the mount 36 of the apparatus 27 may be adhered to the surface damping treatment 58, rather than to the skin 14 exposed through a hole 66 provided in the surface damping treatment 58. Furthermore, other variations may include a different TVA structure than that described above. Any TVA structure that can be appropriately configured in an apparatus secured to the skin of an aircraft fuselage may be used. For example, the TVA could be a simple mass-and-spring system, with or without a dashpot. The TVA could also be structured according to any known elastomeric TVA design.

Additional variations could include TVAs tuned to other frequencies. For example, in an aircraft other than the exemplary King Air 350 discussed above, the fuselage skin panels may vibrate at other frequencies than those discussed above. For instance, after providing damping systems to the fuselage frames, the skin panels may continue to vibrate at frequencies other than 200 Hz or the second harmonic of the BPF. In such a case, the significant frequencies of vibration may be determined, and then TVAs tuned to such frequencies may be provided and secured to the skin panels. Similarly, the TVAs may be secured to different locations or in different quantities on the skin panels. For example, in a particular aircraft it may be determined that a skin panel exhibits significant vibration with a particular mode shape, having one or more antinodes that are located at particular locations. In such a case, one or more skin-mounted TVAs may be provided for attachment at the appropriate locations, such as at each of the antinodes of vibration.

Although the invention herein has been described with reference to particular embodiments, it is to be understood that these: embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for attenuating noise and vibration in a propeller aircraft, the propeller aircraft having a fuselage including a skin, the fuselage further including a plurality of frames connected to the skin and a plurality of stringers spanning between adjacent frames, the space between two adjacent stringers and between two adjacent frames defining a bay, said method comprising:
   mounting one or more first tuned vibration absorbers to the skin of the fuselage so that the one or more first tuned vibration absorbers resides within the bay.

2. The method of claim 1 further comprising:
   wherein the step of mounting one or more first tuned vibration absorbers includes mounting one or more first tuned vibration absorber tuned to one of the significant frequencies of vibration of a fuselage skin panel.

3. The method of claim 1, wherein each first tuned vibration absorber is tuned to a harmonic of a blade passage frequency of a propeller of the aircraft.

4. The method of claim 3, wherein each first tuned vibration absorber is tuned to the second harmonic of the blade passage frequency.

5. The method of claim 1, wherein each first tuned vibration absorber is tuned to 200 hertz.

6. The method of claim 1, wherein the step of mounting one or more first tuned vibration absorbers includes mounting a plurality of first tuned vibration absorbers to the skin of the aircraft fuselage.

7. The method of claim 6, wherein the step of mounting the plurality of first tuned vibration absorbers includes mounting at least one of the plurality of first tubed vibration absorbers to the skin in each of a plurality of bays.

8. The method of claim 7, wherein the step of mounting at least one of the plurality of first tuned vibration absorbers includes mounting at least one of the plurality of first tuned vibration absorbers to the skin at substantially a location of one or more antinodes of vibration of the skin in one of the bays.

9. The method of claim 7, wherein the step of mounting at least one of the plurality of first tuned vibration absorbers includes mounting at least one of the plurality of first tuned vibration absorbers to the skin at substantially the center of each of the plurality of bays.

10. The method of claim 7, wherein the fuselage defines an interior portion divided by a floor, the floor defining a passenger portion on one side thereof, wherein the step of mounting at least one of the plurality of vibration absorbers includes mounting at least one of the plurality of vibration absorbers to the skin in each of a plurality of bays in the passenger portion of the fuselage.

11. The method of claim 7, wherein the fuselage includes a plurality of windows, wherein the step of mounting at least one of the plurality of vibration absorbers includes mounting at least one of the plurality of first tuned vibration absorbers to the skin in at least one of the bays below at least one of the windows.

12. The method of claim 1, wherein the fuselage includes a plurality of frames connected to the skin, further comprising:
mounting one or more second tuned vibration absorbers to one of the plurality of frames.

13. The method of claim 12, wherein each second tuned vibration absorber is tuned to the first harmonic of a blade passage frequency of a propeller of the aircraft.

14. The method of claim 12, wherein each second tuned vibration absorber is tuned to 100 hertz.

15. The method of claim 12, wherein each second tuned vibration absorber is tuned to the first harmonic of a blade passage frequency of a propeller of the aircraft, and wherein each first tuned vibration absorber is tuned to the second harmonic of the blade passage frequency.

16. The method of claim 12, wherein each second tuned vibration absorber is tuned to 100 hertz, and wherein each first tuned vibration absorber is tuned to 200 hertz.

17. The method of claim 1, further comprising:
mounting at least one surface damping treatment to the skin.

18. The method of claim 17, wherein each surface damping treatment includes a stand-off layer.

19. The method of claim 17, wherein the fuselage includes a plurality of frames connected to the skin, further comprising:
mounting one or more second tuned vibration absorbers to one of the plurality of frames.

20. An aircraft having a fuselage including a skin, the fuselage further including a plurality of frames connected to the skin and a plurality of stringers spanning between adjacent frames, the space between two adjacent stringers and between two adjacent frames defining a bay, said aircraft comprising:
one or more first tubed vibration absorbers mounted to the skin of the fuselage so that the one or more first tuned vibration absorbers resides within the bay.

21. The aircraft of claim 20, wherein each first tuned vibration absorber is tuned to a frequency of vibration of a fuselage skin panel.

22. The aircraft of claim 20, wherein each first tuned vibration absorber is tuned to a harmonic of a blade passage frequency of a propeller of the aircraft.

23. The aircraft of claim 22, wherein each first tuned vibration absorber is tuned to the second harmonic of the blade passage frequency.

24. The aircraft of claim 20, wherein each first tuned vibration absorber is tuned to 200 hertz.

25. The aircraft of claim 20, wherein the fuselage includes a plurality of frames connected to the skin, further comprising:
one or more second tuned vibration absorbers mounted to one of the plurality of frames.

26. The aircraft of claim 25, wherein each second tuned vibration absorber is tuned to the first harmonic of a blade passage frequency of a propeller of the aircraft.

27. The aircraft of claim 25, wherein each second tuned vibration absorber is tuned to 100 hertz.

28. The aircraft of claim 25, wherein each second tuned vibration absorber is tuned to the first harmonic of a blade passage frequency of a propeller of the aircraft, and wherein each first tuned vibration absorber is tuned to the second harmonic of the blade passage frequency.

29. The aircraft of claim 25, wherein each second tuned vibration absorber is tuned to 100 hertz, and wherein each first tuned vibration absorber is tuned to 200 hertz.

30. The aircraft of claim 20, further comprising:
at least one surface damping treatment mounted to the skin.

31. The aircraft of claim 30, wherein each surface damping treatment includes a stand-off layer.

32. The aircraft of claim 30, wherein the fuselage includes a plurality of frames connected to the skin, further comprising:
one or more second tuned vibration absorbers mounted to one of the plurality of frames.

* * * * *